United States Patent
Christopher et al.

(10) Patent No.: US 9,806,959 B2
(45) Date of Patent: Oct. 31, 2017

(54) BASEBOARD MANAGEMENT CONTROLLER (BMC) TO HOST COMMUNICATION THROUGH DEVICE INDEPENDENT UNIVERSAL SERIAL BUS (USB) INTERFACE

(71) Applicant: American Megatrends, Inc., Norcross, GA (US)

(72) Inventors: Samvinesh Christopher, Suwanee, GA (US); Anurag Bhatia, Lilburn, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 296 days.

(21) Appl. No.: 14/818,803

(22) Filed: Aug. 5, 2015

(65) Prior Publication Data

US 2017/0041200 A1    Feb. 9, 2017

(51) Int. Cl.
| | |
|---|---|
| *G06F 15/173* | (2006.01) |
| *H04L 12/24* | (2006.01) |
| *H04L 29/08* | (2006.01) |
| *G06F 3/06* | (2006.01) |
| *G06F 13/00* | (2006.01) |
| *H04L 12/26* | (2006.01) |

(52) U.S. Cl.
CPC ............... *H04L 41/24* (2013.01); *G06F 3/06* (2013.01); *G06F 13/00* (2013.01); *H04L 67/1097* (2013.01); *H04L 43/0817* (2013.01)

(58) Field of Classification Search
USPC ....... 709/223, 219; 370/438; 711/6; 710/313
See application file for complete search history.

(56) References Cited

U.S. PATENT DOCUMENTS

| | | | |
|---|---|---|---|
| 8,260,841 B1* | 9/2012 | Maity ................... | G06F 11/301 370/438 |
| 2010/0228960 A1* | 9/2010 | Huang ...................... | G06F 8/65 713/100 |
| 2013/0318205 A1* | 11/2013 | N ....................... | H04N 21/4183 709/219 |
| 2015/0120985 A1* | 4/2015 | Frey ....................... | G06F 12/10 711/6 |
| 2016/0188514 A1* | 6/2016 | Forghani-Zadeh ... | G06F 13/385 710/313 |
| 2017/0041200 A1* | 2/2017 | Christopher ............ | H04L 41/24 |

* cited by examiner

*Primary Examiner* — Tammy Nguyen
(74) *Attorney, Agent, or Firm* — Locke Lord LLP; Tim Tingkang Xia, Esq.

(57) ABSTRACT

Aspects of the disclosure relate to systems and methods for performing communications between a management device and a host computer through a device independent universal serial bus (USB) interface. The system includes a management device communicatively connected to a computing device through a first communication link. In operation, the management device emulates a mass storage device to the computing device through the first communication link, and then identifies the emulated mass storage device as an unsupported mass storage device to the computing device, such that the emulated mass storage device is accessible by the computing device as a bulk-only device. Thus, Intelligent Platform Management Interface (IPMI) communications between the management device and the computing device may be performed using the bulk-only device mechanism.

24 Claims, 4 Drawing Sheets

BASEBOARD MANAGEMENT CONTROLLER (BMC) TO HOST COMMUNICATION THROUGH DEVICE INDEPENDENT UNIVERSAL SERIAL BUS (USB) INTERFACE

FIELD

The present disclosure relates generally to baseboard management controller (BMC) technology, and more particularly to systems and methods for performing communications between a BMC and a host computer through a device independent universal serial bus (USB) interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A baseboard management controller (BMC) is a microcontroller that monitors the health and operation of the computer. The BMC monitors health-related aspects associated with the computer such as the temperature of components within the computer, the speed of rotational components (e.g., spindle motor, CPU fan, etc.) within the system, the voltage across or applied to one or more components within the system, and the available or used capacity of memory devices within the system. Other parameters may also be monitored. In order to make the data gathered by the BMC available to programs and to other computer systems, the Intelligent Platform Management Interface (IPMI) standard has been created. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection.

IPMI defines certain system interfaces for transferring of IPMI messages between the BMC and the host computer, such as a keyboard controller style (KCS) interface, a block transfer (BT) interface, and a system management interface chip (SMIC) interface. In addition to these IPMI-defined system interfaces, there are disclosed techniques for providing a universal serial bus (USB) interface for IPMI communications, since data transfer will be at a higher speed through the USB interface than the IPMI-defined system interfaces such as the KCS interface. For example, the BMC may be used to emulate a virtual mass storage device, such as a CD-ROM device, which functions as a USB device for the host computer. In this case, IPMI commands to be transferred to the BMC may be encapsulated in a small computer systems interface (SCSI) command, which may be directed to the emulated CD-ROM device through the USB interface. Such techniques, however, presents a few major issues. Firstly, modern computer operating systems may put unused devices into a power save mode, in which standard USB devices may go to a low power suspend state. In such situation, the communication link between the BMC (which emulates the CD-ROM device) and the host computer is broken. To avoid breaking the communication link, the host computer OS has to be configured not to put unused devices into the power save mode, which means that all devices will be running in the full power mode such that the emulated CD-ROM device (i.e., the BMC) may be always available to the host computer. Further, since the emulated CD-ROM device cannot be disabled, all the virtual devices will be detected by the BIOS and the OS. This may cause a delay during the startup process of the BIOS. Further, the users of the host computer may be confused by all of the mass storage devices, including real CD-ROM devices and the emulated CD-ROM device, and cannot differentiate between these real and virtual devices.

Therefore, an unaddressed need exists in the art to address the aforementioned deficiencies and inadequacies.

SUMMARY

In one aspect, the present disclosure relates to a system, which includes a management device communicatively connected to a computing device through a first communication link. The management device includes a processor and a storage device storing computer executable code. The computer executable code, when executed at the processor, is configured to: emulate the management device as a mass storage device to the computing device through the first communication link; identify the emulated mass storage device as an unsupported mass storage device to the computing device, such that the emulated mass storage device is accessible by the computing device as a bulk-only device; and in response to receiving a first message from the computing device directed toward the bulk-only device through the first communication link, determine whether the first message is an Intelligent Platform Management Interface (IPMI) message intended for communication with the management device, or a non-IPMI message; and when the first message is the IPMI message, process the IPMI message.

In certain embodiments, the management device is a baseboard management controller (BMC), and the computing device functions as a host computer to the BMC.

In certain embodiments, the first communication link is a universal serial bus (USB) link.

In certain embodiments, the computer executable code, when executed at the processor, is further configured to: generate an IPMI response message in response to the IPMI message; transmit the IPMI response message to the computing device through the first communication link, wherein the computing device is configured to receive the IPMI response message as a response message from the bulk-only device.

In certain embodiments, the computer executable code includes: an emulation module configured to emulate the management device as the mass storage device to the computing device, and to identify the emulated mass storage device as the unsupported mass storage device to the computing device; a determination module configured to determine whether the first message is the IPMI message or the non-IPMI message; and an IPMI module configured to process the IPMI message, generate the IPMI response message, and transmit the IPMI response message to the computing device.

In certain embodiments, the emulation module is configured to identify the emulated mass storage device as the unsupported mass storage device to the computing device by: receiving a small computer systems interface (SCSI) command from the computing device to detect a type of the emulated mass storage device; and in response to receiving the SCSI command, transmitting a response to the computing device to indicate the emulated mass storage device as the unsupported mass storage device.

In certain embodiments, the computing device includes a mass storage processing module configured to: recognize a device connected to the computing device through the first communication link as a mass storage device; transmit the SCSI command to the recognized mass storage device to detect a type of the recognized mass storage device; and receive a response to the SCSI command from the recognized mass storage device to indicate the type of the recognized mass storage device. In certain embodiments, the type of the recognized mass storage device includes a CD-ROM device, a hard disk (HD) device, a floppy disk drive device, and the unsupported mass storage device. In certain embodiments, when the response indicates the type of the recognized mass storage device to be the unsupported mass storage device, the mass storage processing module is configured to identify the unsupported mass storage device as an accessible bulk-only device.

In another aspect, the present disclosure relates to a method for performing communications between a management device and a host computer. In certain embodiments, the method includes: emulating, by the management device, a mass storage device to a computing device through a first communication link, where the computing device functions as the host computer of the management device; identifying, by the management device, the emulated mass storage device as an unsupported mass storage device to the computing device, such that the emulated mass storage device is accessible by the computing device as a bulk-only device; and in response to receiving, at the management device, a first message from the computing device directed toward the bulk-only device through the first communication link, determining, by the management device, whether the first message is an Intelligent Platform Management Interface (IPMI) message intended for communication with the management device, or a non-IPMI message; and when the first message is the IPMI message, processing, at the management device, the IPMI message.

In certain embodiments, the management device is a baseboard management controller (BMC), and the first communication link is a universal serial bus (USB) link.

In certain embodiments, the method further includes: generating, at the management device, an IPMI response message in response to the IPMI message; and transmitting, by the management device, the IPMI response message to the computing device through the first communication link, wherein the computing device is configured to receive the IPMI response message as a response message from the bulk-only device.

In certain embodiments, the emulated mass storage device is identified as the unsupported mass storage device to the computing device by: receiving, by the management device, a small computer systems interface (SCSI) command from the computing device to detect a type of the emulated mass storage device; and in response to receiving the SCSI command, transmitting, by the management device, a response to the computing device to indicate the emulated mass storage device as the unsupported mass storage device.

In certain embodiments, the computing device includes a mass storage processing module configured to: recognize a device connected to the computing device through the first communication link as a mass storage device; transmit the SCSI command to the recognized mass storage device to detect a type of the recognized mass storage device; and receive a response to the SCSI command from the recognized mass storage device to indicate the type of the recognized mass storage device. In certain embodiments, the type of the recognized mass storage device comprises a CD-ROM device, a hard disk (HD) device, a floppy disk drive device, and the unsupported mass storage device. In certain embodiments, when the response indicates the type of the recognized mass storage device to be the unsupported mass storage device, the mass storage processing module is configured to identify the unsupported mass storage device as an accessible bulk-only device.

A further aspect of the present disclosure relates to a non-transitory computer readable medium storing computer executable code. When the computer executable code is executed at a processor of a management device, the computer executable code is configured to: emulate the management device as a mass storage device to a computing device through a first communication link, where the management device is communicatively connected to the computing device through the first communication link; identify the emulated mass storage device as an unsupported mass storage device to the computing device, such that the emulated mass storage device is accessible by the computing device as a bulk-only device; and in response to receiving a first message from the computing device directed toward the bulk-only device through the first communication link, determine whether the first message is an Intelligent Platform Management Interface (IPMI) message intended for communication with the management device, or a non-IPMI message; and when the first message is the IPMI message, process the IPMI message.

In certain embodiments, the management device is a baseboard management controller (BMC), the computing device functions as a host computer to the BMC, and the first communication link is a universal serial bus (USB) link.

In certain embodiments, the computer executable code, when executed at the processor, is further configured to: generate an IPMI response message in response to the IPMI message; and transmit the IPMI response message to the computing device through the first communication link, wherein the computing device is configured to receive the IPMI response message as a response message from the bulk-only device.

In certain embodiments, the computer executable code includes: an emulation module configured to emulate the management device as the mass storage device to the computing device, and to identify the emulated mass storage device as the unsupported mass storage device to the computing device; a determination module configured to determine whether the first message is the IPMI message or the non-IPMI message; and an IPMI module configured to process the IPMI message, generate the IPMI response message, and transmit the IPMI response message to the computing device.

In certain embodiments, the emulation module is configured to identify the emulated mass storage device as the unsupported mass storage device to the computing device by: receiving a small computer systems interface (SCSI) command from the computing device to detect a type of the emulated mass storage device; and in response to receiving the SCSI command, transmitting a response to the computing device to indicate the emulated mass storage device as the unsupported mass storage device.

In certain embodiments, the computing device comprises a mass storage processing module configured to: recognize a device connected to the computing device through the first communication link as a mass storage device; transmit the SCSI command to the recognized mass storage device to detect a type of the recognized mass storage device; and receive a response to the SCSI command from the recognized mass storage device to indicate the type of the recognized mass storage device.

In certain embodiments, the type of the recognized mass storage device comprises a CD-ROM device, a hard disk (HD) device, a floppy disk drive device, and the unsupported mass storage device. In certain embodiments, when the response indicates the type of the recognized mass storage device to be the unsupported mass storage device, the mass storage processing module is configured to identify the unsupported mass storage device as an accessible bulk-only device.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
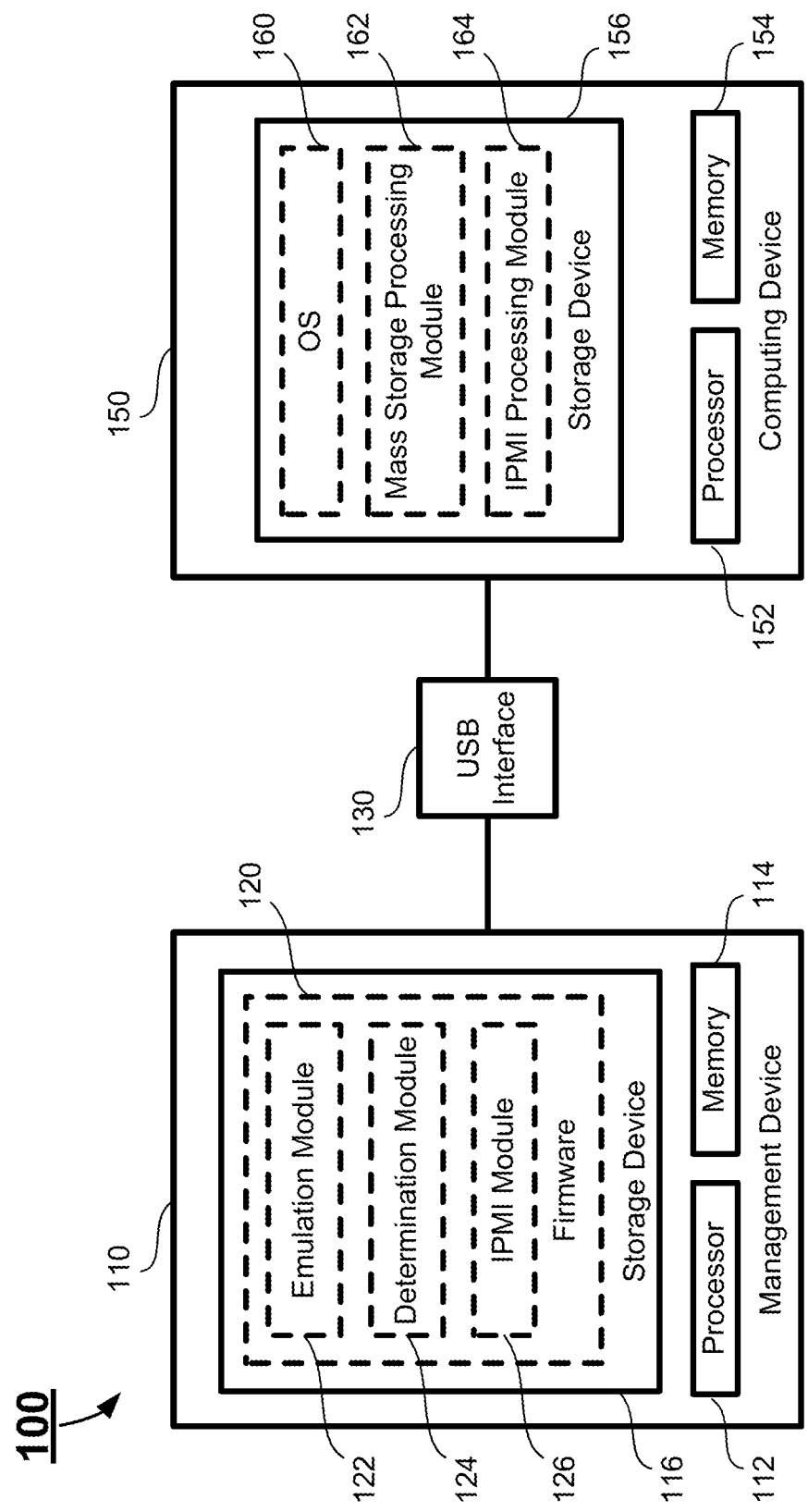
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As discussed above, techniques have been disclosed using the BMC to emulate a virtual mass storage device, such as a CD-ROM device, which functions as a USB device (and thus the data transport mechanism) for the host computer. In this case, IPMI commands to be transferred to the BMC may be encapsulated in the SCSI command, which may be directed to the emulated CD-ROM device through the USB interface. Such techniques, however, requires the host computer OS not to put any unused devices into the power save mode. To overcome such issues, the present disclosure provides a new data transport mechanism to remove the emulated CD-ROM device being exposed to the host computer. In other words, the host computer will not see the BMC as an emulated CD-ROM device. This will remove the ability of using the SCSI commands for sending the IPMI messages. Thus, to transfer IPMI messages between the BMC and the host computer using the USB interface, an alternative transport mechanism is needed.

Certain aspects of the disclosure relate to systems and methods for performing communications between a management device and a computing device through a device independent USB interface. In certain embodiments, the management device emulates a mass storage device to the computing device through the USB interface. When the computing device sends a SCSI command to inquire the type of the emulated mass storage device, the management device identifies the emulated mass storage device as an unsupported mass storage device, instead of a CD-ROM device, a hard disk device or a floppy disk drive device. In this case, the computing device will not be capable of finding the type of the unsupported mass storage device, and will not create a virtual device. Even though the computing device does not see the management device as a virtual device, however, the computing device may still access the management device as a bulk-only device, and send messages through the bulk interfaces. This is a simpler implementation which requires fewer modifications to the existing framework of the management device than the emulation of CD-ROM device technique.

In accordance with the purposes of present disclosure, as embodied and broadly described herein, in certain aspects, the present disclosure relates to a computer system 100. FIG. 1 schematically depicts an exemplary system according to certain embodiments of the present disclosure. As shown in FIG. 1, the system 100 includes a management device 110, and a computing device 150. The management device 110 is communicatively connected to the computing device 150 through a USB interface 130, which may provide a USB link as the communication link between the management device 110 and the computing device 150. In addition to the USB interface 130, although not explicitly shown in FIG. 1, the management device 110 may be further communicatively connected to the computing device 150 via other communication links. Examples of these additional communication links may include, without being limited to, a network or other in-band or out-of band (OOB) interfaces, such as the IPMI-defined in-band KCS, BT, SMIC system interfaces, or other OOB serial interfaces. The network may be a wired or wireless network, and may be of various forms, such as a public network and a private network. Examples of the network may include, but not limited to, a local area network (LAN) or wide area network (WAN) including the Internet. However, for the purpose of the present disclosure, data transfer between the management device 110 and the computing device 150 will be via the USB interface 130.

The USB interface 130 is the communication link between the management device 110 and the computing device 150. Specifically, the USB interface 130 a standardized interface under the USB industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. The USB interface 130 has become commonplace on other devices, such as smartphones, PDAs and video game consoles. USB has effectively replaced a variety of earlier interfaces, such as serial and parallel ports, as well as separate power chargers for portable devices. Currently, USB allows bi-directional communications between the computing devices and the USB devices, as USB 3.0 allows for device-initiated communications towards the host.

Generally, USB communication is based on pipes (logical channels). A pipe is a connection from the host controller at the computing device 150 (which functions as the host computer) to a logical entity found on the management device 110 (which functions as an emulated mass storage device). The logical entity is generally named an "endpoint." Because pipes correspond 1-to-1 to endpoints, the terms are sometimes used interchangeably. A USB device has a default endpoint zero, and could have up to 32 endpoints. The pipes and/or endpoints may be IN (meaning data transaction is from the USB device to the host computer), or may be OUT (data transaction from the host computer to the USB device).

Generally, USB communication is based on pipes (logical channels). A pipe is a connection from the host controller at the computing device 150 (which functions as the host computer) to a logical entity found on the management device 110 (which functions as a USB HID device). The logical entity is generally named an "endpoint." Because pipes correspond 1-to-1 to endpoints, the terms are sometimes used interchangeably. A USB device has a default endpoint zero, and could have up to 32 endpoints. The pipes and/or endpoints may be IN (meaning data transaction is from the USB device to the host computer), or may be OUT (data transaction from the host computer to the USB device).

The management device 110 is a specialized management controller that manages the interface between system management software and platform hardware. In certain embodiments, the management device 110 may be implemented by a system on chip (SoC), such as a BMC or a service processor (SP), or by other management controllers. Different types of sensors can be built into the computing device 150, and the management device 110 reads these sensors to obtain parameters such as temperature, cooling fan speeds, power status, OS status, etc.

In certain embodiments, the management device 110 may include necessary hardware and software components to perform certain predetermined tasks. For example, as shown in FIG. 1, the management device 110 includes a processor 112, a memory 114, and a storage device 116. Further, the management device 110 may include other hardware components and software components (not shown) to perform its corresponding tasks. Examples of these hardware and software components may include, but not limited to, other required memory, interfaces, buses, I/O modules and peripheral devices.

The processor 112 is configured to control operation of the management device 110. In certain embodiments, the processor 112 may be a central processing unit (CPU). The processor 112 can execute any computer executable code or instructions, such as the firmware 120 of the server management device 110 or other applications and instructions of the management device 110. In certain embodiments, the management device 110 may run on more than one processor, such as two processors, four processors, eight processors, or any suitable number of processors.

The memory 114 can be a volatile memory, such as the random-access memory (RAM), for storing the data and information during the operation of the management device 110. In certain embodiments, the memory 114 may be a volatile memory array.

The storage device 116 is a non-volatile data storage media for storing the applications of the management device 110. Examples of the storage device 116 may include non-volatile memory such as flash memory, memory cards, USB drives, hard drives, floppy disks, optical drives, or any other types of data storage devices. In certain embodiments, the management device 110 may have multiple storage devices 116, which may be identical storage devices or different types of storage devices, and the applications may be stored in one or more of the storage devices 116 of the management device 110.

As shown in FIG. 1, the storage device 116 of the management device 110 stores a firmware 120, which may include, among other things, an emulation module 122, a determination module 124, and an IPMI module 126. In certain embodiments, the firmware 120 may store other applications necessary for the operation of the management device 110. It should be noted that all of the modules of the firmware 120 are each implemented by computer executable codes or instructions, which collectively forms the firmware 120. In certain embodiments, each of the modules may further include sub-modules. Alternatively, some of the modules may be combined as one stack.

The emulation module 122 is configured to emulate the management device 110 as the mass storage device to the computing device 150, and to identify the emulated mass storage device (i.e., the management device 110) as the unsupported mass storage device to the computing device 150. Thus, the emulated mass storage device (i.e., the management device 110) is accessible by the computing device 150 as a bulk-only device. Generally, there are certain types of mass storage devices recognizable by the computing device 150, such as a CD-ROM device, a hard disk (HD) device, and a floppy disk drive device. The emulation module 122 will identify the type of the emulated mass storage device as "unsupported", thus indicating the type of the emulated mass storage device not to be any of the recognized mass storage devices by the computing device 150. Specifically, when the emulation module 122 emulates the management device 110 as the mass storage device to the computing device 150, the computing device 150 will send a SCSI command to the management device 110 to detect a type of the emulated mass storage device. In response to the SCSI command, the emulation module 122 sends a response to the computing device 150 to indicate the emulated mass storage device as the unsupported mass storage device. In this case, the computing device 150 does not see the management device 110 as a specific type of the mass storage device. However, the computing device 150 may still access the management device 110 as a bulk-only device.

The determination module 124 is configured to, when the management device 110 receives a message directed toward the bulk-only device (i.e., the management device 110) from the computing device 150 through the USB interface 130, determine whether the message is an IPMI message intended for communication with the management device 110, or a non-IPMI message not intended for communication with the management device 110. Specifically, as disclosed above, when the emulation module 122 emulates the management device 110 as a mass storage device and identifies the type of the emulated mass storage device as unsupported, the computing device 150 does not see the management device 110 as any specific type of the mass storage device, but may access the unsupported mass storage device (i.e., the management device 110) through the USB interface 130 as a bulk-only device. In this case, the computing device 150 may send IPMI messages through the USB interface 130 to the bulk-only device (i.e., the management device 110). When the determination module 124 determines that the message received is an IPMI message, the determination module 124 may send the IPMI message to the IPMI module 126 for processing. On the other hand, in certain embodiments, the computing device 150 may send non-IPMI messages to the bulk-only device (i.e., the management device 110). When the determination module 124 determines that the message received is a non-IPMI message, the determination module 124 does nothing.

The IPMI module 126 is a program of the management device 110 to generate and process IPMI messages. Specifically, when the IPMI module 126 receives an IPMI message, the IPMI module 126 processes the IPMI message. In certain embodiments, based on the processing of the IPMI message, the IPMI module 126 may generate an IPMI response message in response to the IPMI message, and then send the IPMI response message back to its origin. For example, when the IPMI message is from the computing device 150, the IPMI module 126 may process the IPMI message, generate a corresponding IPMI response message, and send the IPMI response message back to the computing device 150 through the USB interface 130.

The computing device 150 is a host computer of the management device 110. In certain embodiments, the computing device 150 may be a general purpose computer, a specialized computer, or a headless computer. In certain embodiments, the management device 110 may be connected to more than one computing device, and among these computing devices, only the computing device 150 functions as the host computer of the management device 110.

The components of the computing device 150 may include, without being limited to, a processor 152, a memory 154, a storage device 156, and other required memory and I/O modules (not shown). Generally, the computing device 150 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. In certain embodiments, the processor 152 and the memory 154 may be components embedded on the baseboard, or may be connected to the baseboard through at least one interface. In certain embodiments, the management device 110 may also be a component on the baseboard. In certain embodiments, the interface may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements. In certain embodiments, the processor 152 and the memory 154 may be similar to the processor 112 and the memory 114 of the management device 110, and details of the processor 152 and the memory 154 is not further elaborated.

The storage device 156 is a non-volatile data storage media for storing the applications of the computing device 150. Examples of the storage device 156 may include non-volatile memory such as flash memory, memory cards, USB drives, hard drives, floppy disks, optical drives, or any other types of data storage devices. In certain embodiments, the computing device 150 may have multiple storage devices 156, which may be identical storage devices or different types of storage devices, and the applications of the computing device 150 may be stored in one or more of the storage devices 156 of the computing device 150.

As shown in FIG. 1, the storage device 156 of the computing device 150 stores, among other things, an operating system (OS) 160, a mass storage processing module 162, and an IPMI processing module 164. In certain embodiments, the storage device 156 may store other applications necessary for the operation of the computing device 150. It should be noted that all of the modules of the storage device 156 are each implemented by computer executable codes or instructions, and each of the modules may further include sub-modules distributed in different storage devices 156. Alternatively, some of the modules may be combined as one module. In certain embodiments, functionalities of one of the modules may be provided by multiple independently executed modules.

The OS 160 is a collective management software application managing the operation of the computing device 150. For example, the OS 160 can include a set of functional programs that control and manage operations of the devices connected to the computing device 150. The set of application programs provide certain utility software for the user to manage the computing device 150. In certain embodiments, the OS 160 is operable to multitask, i.e., execute computing tasks in multiple threads. Examples of the OS may be any of the commercial operating systems, such as Microsoft Windows, LINUX, UNIX, or any other operating systems.

The mass storage processing module 162 is a module for processing the mass storage features. In certain embodiments, the mass storage processing module 162 may be implemented by one or more mass storage drivers. Specifically, the mass storage processing module 162 may recognize a device connected to the computing device 150 through the USB interface 130 as a mass storage device, and then sends a SCSI command to the recognized mass storage device to detect a type of the recognized mass storage device. When the mass storage processing module 162 receives a response to the SCSI command from the recognized mass storage device, the mass storage processing module 162 may detect the type of the recognized mass storage device indicated by the response. There are certain types of mass storage devices typically recognizable by the computing device 150, such as a CD-ROM device, a hard disk (HD) device, and a floppy disk drive device. As disclosed above, the emulation module 122 of the management device 110 will identify the type of the emulated mass storage device as "unsupported" to indicate the type of the emulated mass storage device not to be any of the recognized mass storage devices by the computing device 150. When the mass storage processing module 162 receives such a response from the management device 110, the mass storage processing module 162 may detect the type of the emulated mass storage device (i.e., the management device 110) to be the unsupported mass storage device. Thus, the emulated mass storage device (i.e., the management device 110) is accessible by the computing device 150 as a bulk-only device.

The IPMI processing module 164 is a computer program at the computing device 150 that generates and processes IPMI messages. In certain embodiments, the IPMI processing module 164 may be separated from the OS 160 as an independent program. Alternatively, the IPMI processing module 164 may be a part of the OS 160, which is compatible to the IPMI architecture for generating and processing IPMI messages. In certain embodiments, when the mass storage processing module 162 identifies an emulated mass storage device to be the unsupported mass storage device, the IPMI processing module 164 may recognize the emulated mass storage device as an accessible bulk-only device. Thus, the IPMI processing module 164 may generate IPMI messages to be directed to the bulk-only device (i.e., the management device 110), and transmit the IPMI message to the bulk-only device (i.e., the management device 110) through the USB interface 130. In certain embodiments, when the management device 110 sends an IPMI response message back to the computing device 150 through the USB interface 130 in response to the IPMI messages sent to the bulk-only device (i.e., the management device 110), the IPMI processing module 164 may receive the IPMI response message, and process the IPMI response message.

Figure 2A:
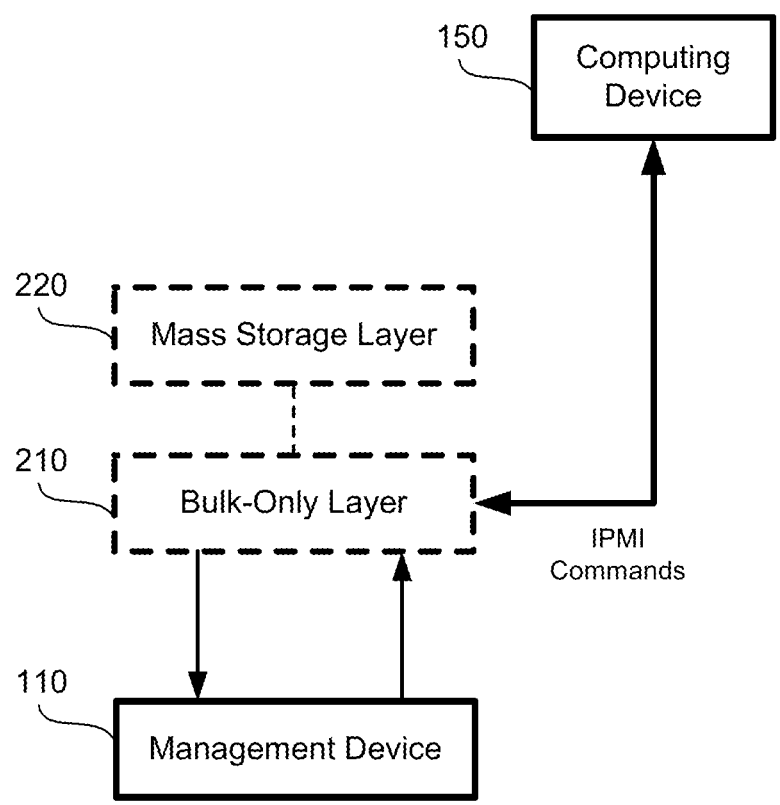
FIG. 2A schematically depicts software emulation of the management device according to certain embodiments of the present disclosure.

FIG. 2A schematically depicts software emulation of the management device according to certain embodiments of the present disclosure. As shown in FIG. 2A, when the management device 110 emulates a mass storage device, a bulk-only layer 210 and a mass storage layer 220 are created. Assuming that the management device 110 identifies itself to emulate a certain type of the mass storage device (e.g., a CD-ROM device, a HD device, or a floppy disk drive device), an additional layer will be created above the mass storage layer 220 to indicate the type of the mass storage device. For example, if the management device 110 identifies itself to emulate a CD-ROM device, there will be a CD-ROM layer created above the mass storage layer 220. However, since the management device 110 indicates itself as an unsupported mass storage device, no virtual mass storage device has been created. Thus, the computing device 150 will see the emulated mass storage device (i.e., the management device 110) as a bulk-only device, and communicate with the bulk-only layer directly.

Figure 2B:
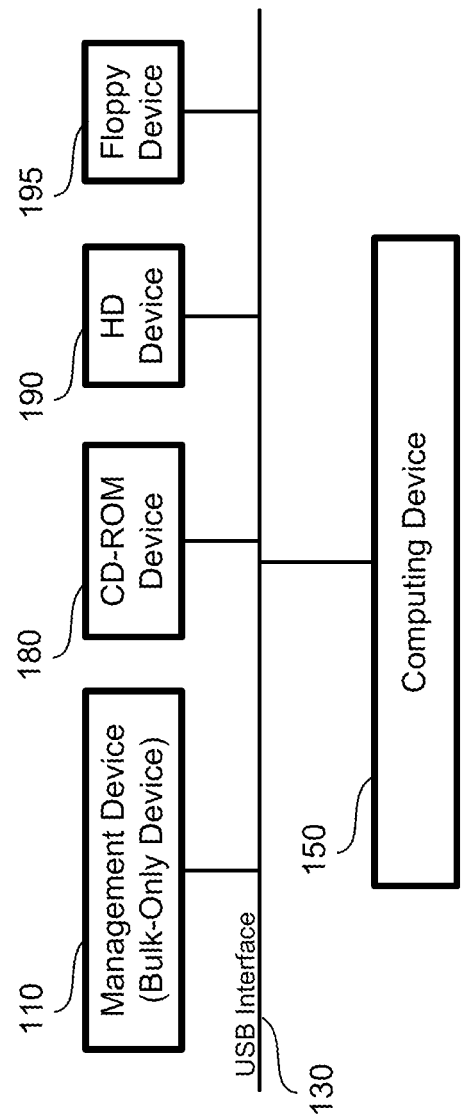
FIG. 2B schematically depicts communication between the management device and the computing device according to certain embodiments of the present disclosure.

FIG. 2B schematically depicts communication between the management device and the computing device according to certain embodiments of the present disclosure. As shown in FIG. 2B, the management device 110 is connected to the computing device 150 through the USB interface 130. On the other hand, the computing device 150 may have other mass storage devices connected, such as a CD-ROM device 180, a HD device 190, and a floppy disk drive device 195, through the USB interface 130. In this case, each of the mass storage devices (including the CD-ROM device 180, the HD device 190, and the floppy disk drive device 195) will respectively identify itself to the computing device 150 to indicate the respective type of the mass storage device. Since the management device 110 identifies itself as an unsupported mass storage device, the computing device 150 sees the management device 110 as a bulk-only device, and the IPMI processing module 164 will only communicate with the bulk-only device (i.e., the management device 110) using IPMI messages. Thus, an IPMI communication between the computing device 150 and the management device 110 through the USB interface 130 may be achieved. Further, the mass storage processing module 162 may communicate with other mass storage devices (the CD-ROM device 180, the HD device 190, and the floppy disk drive device 195) regularly. When one of these mass storage devices is unused, the OS 160 of the computing device 150 may put the unused mass storage device into a power save mode, without affecting the IPMI communication between the computing device 150 and the management device 110. If the computing device 150 communicates with the bulk-only device (i.e., the management device 110) using non-IPMI messages, the management device 110 would simply not respond to the non-IPMI messages.

Figure 3:
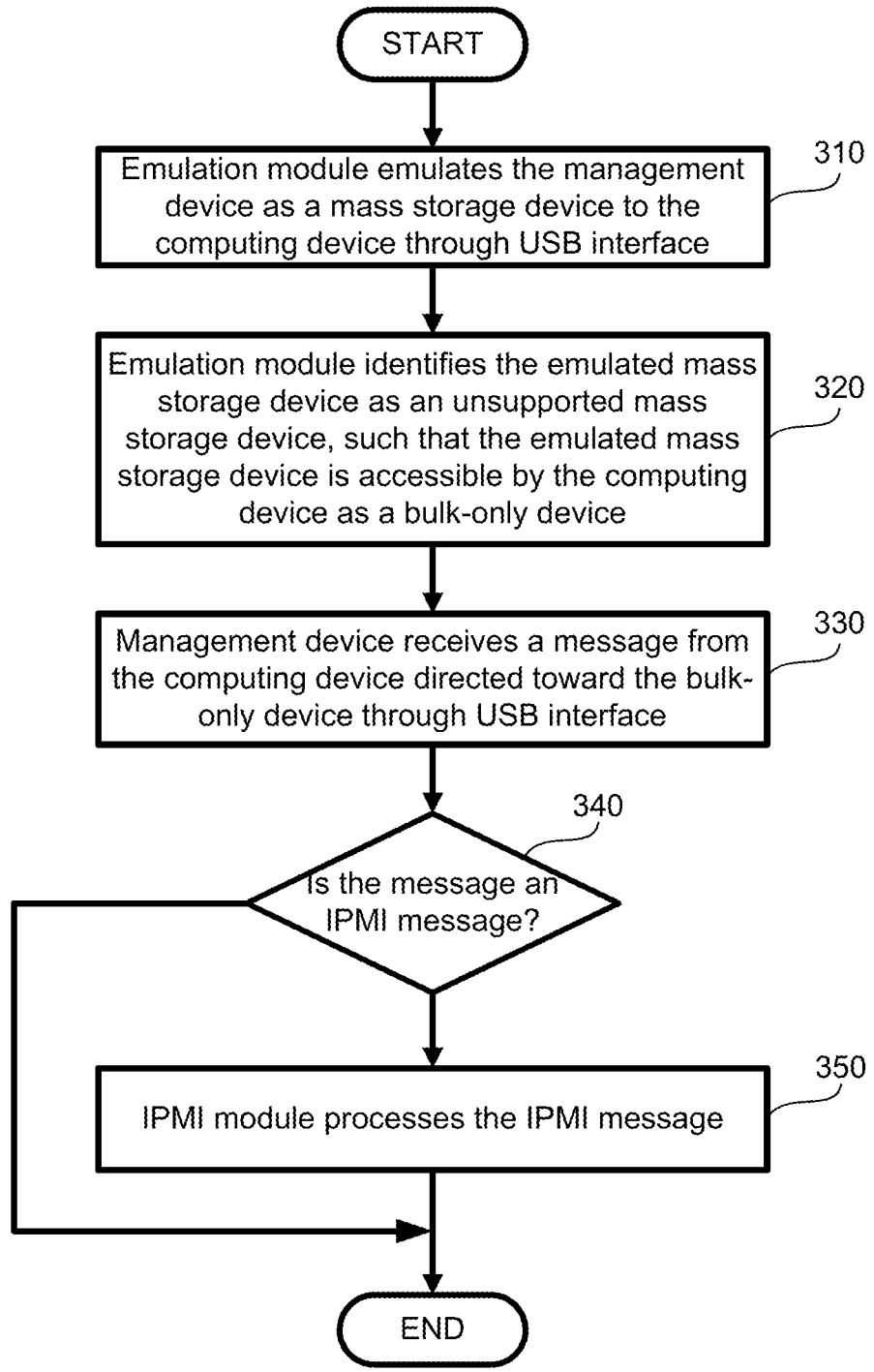
FIG. 3 shows a flowchart of a method for performing communications between a management device and a computing device according to certain embodiments of the present disclosure.

Another aspect of the present disclosure relates to a computer implemented method of performing an IPMI communication between a host computing device and a management device. FIG. 3 shows a flowchart of a method for performing communications between a management device and a computing device according to certain embodiments of the present disclosure. In certain embodiments, the method may be implemented on a system 100 as shown in FIG. 1. For example, the method may be implemented by the execution of the firmware 120 at the processor 112 of the management device 110 of the system 100. It should be noted that the method as shown in FIG. 3 merely represent certain embodiments of the present disclosure, and is not intended to be exhaustive or to limit the disclosure to the precise forms disclosed.

At procedure 310, the emulation module 122 of the management device 110 may emulate the management device 110 as a mass storage device to the computing device 150 through USB interface 130. Specifically, when the management device 110 is connected to the computing device 150 through the USB interface 130, the mass storage processing module 162 of the computing device 150 may recognize the management device 110 as a mass storage device. Then, at procedure 320, the emulation module 122 may identify the emulated mass storage device as an unsupported mass storage device to the computing device 150, such that the emulated mass storage device is accessible by the computing device 150 as a bulk-only device. Specifically, the mass storage processing module 162 of the computing device 150 may send a SCSI command to the recognized mass storage device to detect a type of the recognized mass storage device. When the management device 110 receives the SCSI command, the emulation module 122 will send a response back to computing device 150 to indicate the type of the emulated mass storage device as "unsupported." Upon receiving the response, the mass storage processing module 162 of the computing device 150 may see the emulated mass storage device (i.e., the management device 110) as a bulk only-device based on the response.

At procedure 330, the management device 110 receives a message from the computing device 150 directed toward the bulk-only device (i.e., the management device 110) through the USB interface 130. In this case, the message may be an IPMI message issued by the IPMI processing module 164 of the computing device 150, which is intended for communication with the management device 110; or may be a non-IPMI message.

At procedure 340, the determination module 124 determines whether the message received from the computing device 150 is an IPMI message. When the message is a non-IPMI message, the determination module 124 ends the procedures without doing anything. Alternatively, when the message is an IPMI message, at procedure 350, the IPMI module 126 processes the IPMI message. In certain embodiments, based on the processing of the IPMI message, the IPMI module 126 may generate an IPMI response message in response to the IPMI message, and then send the IPMI response message back to the computing device 150.

In yet another aspect, the present disclosure relates to a non-transitory computer readable medium storing computer executable code. In certain embodiments, the computer executable code may be at least a part of the firmware 120 of the management device 110 as described above. In certain embodiments, the non-transitory computer readable medium may include, but not limited to, the storage device 116 of the management device 110 as described above, or any other storage media of the management device 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a management device communicatively connected to a computing device through a first communication link, the management device comprising a processor and a storage device storing computer executable code, wherein the computer executable code, when executed at the processor, is configured to:
emulate the management device as a mass storage device to the computing device through the first communication link;
identify the emulated mass storage device as an unsupported mass storage device to the computing device, such that the emulated mass storage device is accessible by the computing device as a bulk-only device; and
in response to receiving a first message from the computing device directed toward the bulk-only device through the first communication link,
determine whether the first message is an Intelligent Platform Management Interface (IPMI) message intended for communication with the management device, or a non-IPMI message; and
when the first message is the IPMI message, process the IPMI message,
wherein the computing device comprises:
a mass storage processing module, configured to identify the emulated mass storage device to be the unsupported mass storage device, and
an IPMI processing module, configured to recognize the emulated mass storage device as an accessible bulk-only device, generate the IPMI message to be directed to the bulk-only device and transmit the IPMI message to the bulk-only device through the first communication link.

2. The system as claimed in claim 1, wherein the management device is a baseboard management controller (BMC), and the computing device functions as a host computer to the BMC.

3. The system as claimed in claim 1, wherein the first communication link is a universal serial bus (USB) link.

4. The system as claimed in claim 1, wherein the computer executable code, when executed at the processor, is further configured to:
generate an IPMI response message in response to the IPMI message; and
transmit the IPMI response message to the computing device through the first communication link, wherein the computing device is configured to receive the IPMI response message as a response message from the bulk-only device.

5. The system as claimed in claim 4, wherein the computer executable code comprises:
an emulation module configured to emulate the management device as the mass storage device to the computing device, and to identify the emulated mass storage device as the unsupported mass storage device to the computing device;

a determination module configured to determine whether the first message is the IPMI message or the non-IPMI message; and
an IPMI module configured to process the IPMI message, generate the IPMI response message, and transmit the IPMI response message to the computing device.

6. The system as claimed in claim 5, wherein the emulation module is configured to identify the emulated mass storage device as the unsupported mass storage device to the computing device by:
receiving a small computer systems interface (SCSI) command from the computing device to detect a type of the emulated mass storage device; and
in response to receiving the SCSI command, transmitting a response to the computing device to indicate the emulated mass storage device as the unsupported mass storage device.

7. The system as claimed in claim 6, wherein the mass storage processing module is further configured to:
recognize a device connected to the computing device through the first communication link as a mass storage device;
transmit the SCSI command to the recognized mass storage device to detect a type of the recognized mass storage device; and
receive a response to the SCSI command from the recognized mass storage device to indicate the type of the recognized mass storage device.

8. The system as claimed in claim 7, wherein the type of the recognized mass storage device comprises a CD-ROM device, a hard disk (HD) device, a floppy disk drive device, and the unsupported mass storage device.

9. The system as claimed in claim 7, wherein when the response indicates the type of the recognized mass storage device to be the unsupported mass storage device, the mass storage processing module is configured to identify the unsupported mass storage device as the accessible bulk-only device.

10. A method for performing communications between a management device and a host computer, the method comprising:
emulating, by the management device, a mass storage device to a computing device through a first communication link, wherein the computing device functions as the host computer of the management device;
identifying, by the management device, the emulated mass storage device as an unsupported mass storage device to the computing device, such that the emulated mass storage device is accessible by the computing device as a bulk-only device; and
in response to receiving, at the management device, a first message from the computing device directed toward the bulk-only device through the first communication link,
determining, by the management device, whether the first message is an Intelligent Platform Management Interface (IPMI) message intended for communication with the management device, or a non-IPMI message; and
when the first message is the IPMI message, processing, at the management device, the IPMI message,
wherein the computing device comprises:
a mass storage processing module, configured to identify the emulated mass storage device to be the unsupported mass storage device, and
an IPMI processing module, configured to recognize the emulated mass storage device as an accessible bulk-only device, generate the IPMI message to be directed to the bulk-only device and transmit the IPMI message to the bulk-only device through the first communication link.

11. The method as claimed in claim 10, wherein the management device is a baseboard management controller (BMC), and the first communication link is a universal serial bus (USB) link.

12. The method as claimed in claim 10, further comprising:
generating, at the management device, an IPMI response message in response to the IPMI message; and
transmitting, by the management device, the IPMI response message to the computing device through the first communication link, wherein the computing device is configured to receive the IPMI response message as a response message from the bulk-only device.

13. The method as claimed in claim 10, wherein the emulated mass storage device is identified as the unsupported mass storage device to the computing device by:
receiving, by the management device, a small computer systems interface (SCSI) command from the computing device to detect a type of the emulated mass storage device; and
in response to receiving the SCSI command, transmitting, by the management device, a response to the computing device to indicate the emulated mass storage device as the unsupported mass storage device.

14. The method as claimed in claim 13, wherein the mass storage processing module is further configured to:
recognize a device connected to the computing device through the first communication link as a mass storage device;
transmit the SCSI command to the recognized mass storage device to detect a type of the recognized mass storage device; and
receive a response to the SCSI command from the recognized mass storage device to indicate the type of the recognized mass storage device.

15. The method as claimed in claim 14, wherein the type of the recognized mass storage device comprises a CD-ROM device, a hard disk (HD) device, a floppy disk drive device, and the unsupported mass storage device.

16. The method as claimed in claim 14, wherein when the response indicates the type of the recognized mass storage device to be the unsupported mass storage device, the mass storage processing module is configured to identify the unsupported mass storage device as the accessible bulk-only device.

17. A non-transitory computer readable medium storing computer executable code, wherein the computer executable code, when executed at a processor of a management device, is configured to
emulate the management device as a mass storage device to a computing device through a first communication link, wherein the management device is communicatively connected to the computing device through the first communication link;
identify the emulated mass storage device as an unsupported mass storage device to the computing device, such that the emulated mass storage device is accessible by the computing device as a bulk-only device; and
in response to receiving a first message from the computing device directed toward the bulk-only device through the first communication link,
determine whether the first message is an Intelligent Platform Management Interface (IPMI) message intended for communication with the management device, or a non-IPMI message; and
when the first message is the IPMI message, process the IPMI message,
wherein the computing device comprises:
a mass storage processing module, configured to identify the emulated mass storage device to be the unsupported mass storage device, and
an IPMI processing module, configured to recognize the emulated mass storage device as an accessible bulk-only device, generate the IPMI message to be directed to the bulk-only device and transmit the IPMI message to the bulk-only device through the first communication link.

18. The non-transitory computer readable medium as claimed in claim 17, wherein the management device is a baseboard management controller (BMC), the computing device functions as a host computer to the BMC, and the first communication link is a universal serial bus (USB) link.

19. The non-transitory computer readable medium as claimed in claim 17, the computer executable code, when executed at the processor, is further configured to:
generate an IPMI response message in response to the IPMI message; and
transmit the IPMI response message to the computing device through the first communication link, wherein the computing device is configured to receive the IPMI response message as a response message from the bulk-only device.

20. The non-transitory computer readable medium as claimed in claim 19,
wherein the computer executable code comprises:
an emulation module configured to emulate the management device as the mass storage device to the computing device, and to identify the emulated mass storage device as the unsupported mass storage device to the computing device;
a determination module configured to determine whether the first message is the IPMI message or the non-IPMI message; and
an IPMI module configured to process the IPMI message, generate the IPMI response message, and transmit the IPMI response message to the computing device.

21. The non-transitory computer readable medium as claimed in claim 20, wherein the emulation module is configured to identify the emulated mass storage device as the unsupported mass storage device to the computing device by:
receiving a small computer systems interface (SCSI) command from the computing device to detect a type of the emulated mass storage device; and
in response to receiving the SCSI command, transmitting a response to the computing device to indicate the emulated mass storage device as the unsupported mass storage device.

22. The non-transitory computer readable medium as claimed in claim 21, wherein the mass storage processing module is further configured to:
recognize a device connected to the computing device through the first communication link as a mass storage device;
transmit the SCSI command to the recognized mass storage device to detect a type of the recognized mass storage device; and receive a response to the SCSI command from the recognized mass storage device to indicate the type of the recognized mass storage device.

23. The non-transitory computer readable medium as claimed in claim 22, wherein the type of the recognized mass storage device comprises a CD-ROM device, a hard disk (HD) device, a floppy disk drive device, and the unsupported mass storage device.

24. The non-transitory computer readable medium as claimed in claim 22, wherein when the response indicates the type of the recognized mass storage device to be the unsupported mass storage device, the mass storage processing module is configured to identify the unsupported mass storage device as the accessible bulk-only device.

* * * * *